(No Model.) 5 Sheets—Sheet 1.

W. BIRKS & H. S. CROPPER.
EMBROIDERING MACHINE.

No. 424,846. Patented Apr. 1, 1890.

(No Model.) 5 Sheets—Sheet 2.

W. BIRKS & H. S. CROPPER.
EMBROIDERING MACHINE.

No. 424,846. Patented Apr. 1, 1890.

Attest:
Samuel H Knight
Emma Arthur

Inventors
William Birks
Henry Smith Cropper
By Knight Bros.
Attys (No Model.) 5 Sheets—Sheet 3.
W. BIRKS & H. S. CROPPER.
EMBROIDERING MACHINE.
No. 424,846. Patented Apr. 1, 1890.
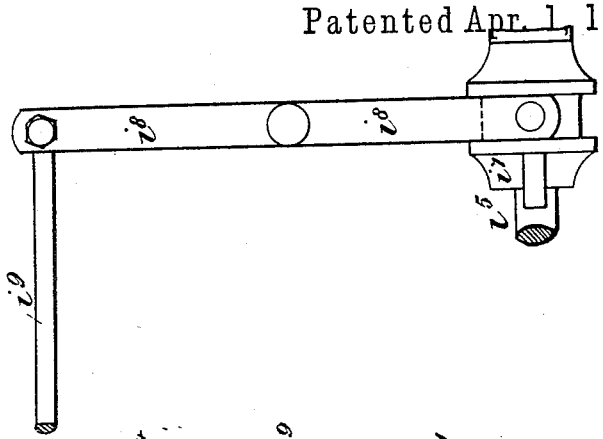
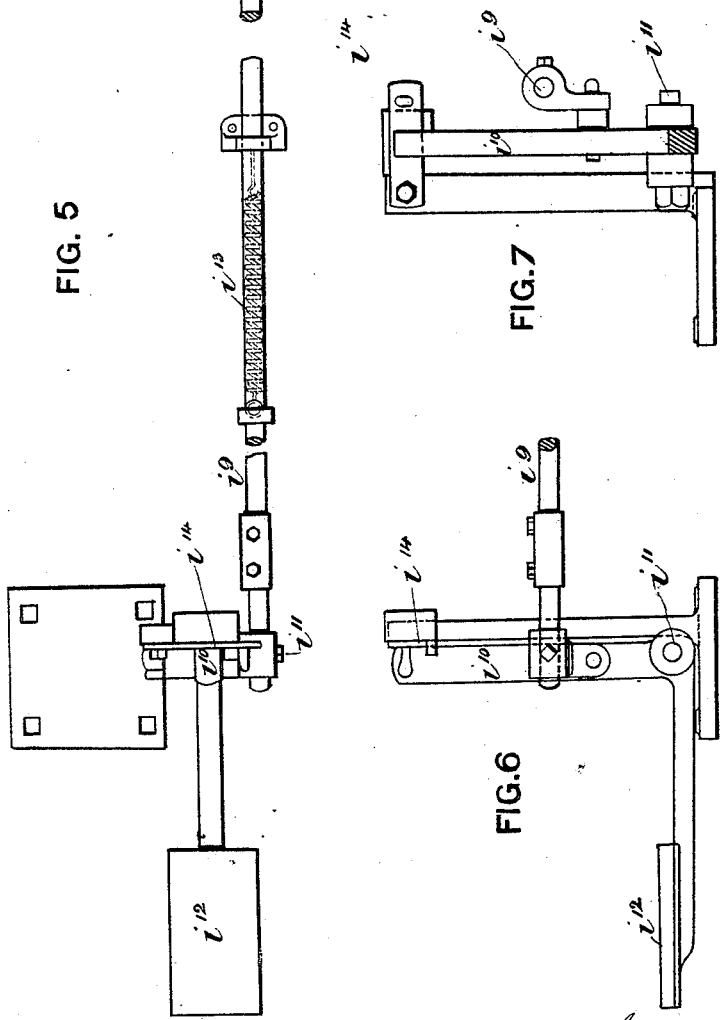
FIG. 5
FIG. 7
FIG. 6
Attest:
Samuel H. Knight.
Emma Arthur
Inventors
William Birks
Henry Smith Cropper
By Knight Bros.
Attys.

(No Model.) 5 Sheets—Sheet 4.

W. BIRKS & H. S. CROPPER.
EMBROIDERING MACHINE.

No. 424,846. Patented Apr. 1, 1890.

Attest:
Samuel H. Knight.
Emma Arthur.

Inventors
William Birks
Henry Smith Cropper
By Knight Bros.
Attys

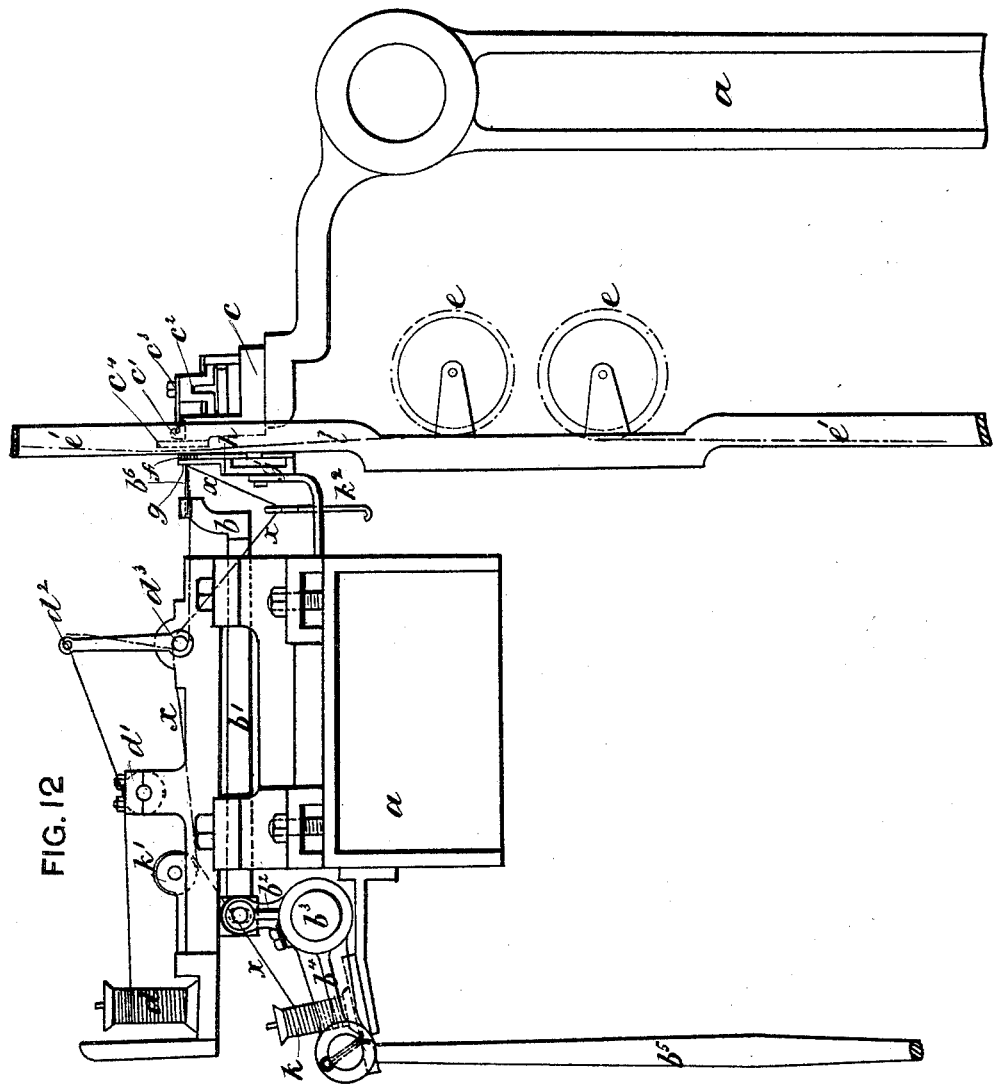

UNITED STATES PATENT OFFICE.

WILLIAM BIRKS AND HENRY SMITH CROPPER, OF NOTTINGHAM, ENGLAND.

EMBROIDERING-MACHINE.

SPECIFICATION forming part of Letters Patent No. 424,846, dated April 1, 1890.

Application filed August 8, 1889. Serial No. 320,137. (No model.) Patented in England January 26, 1888, No. 1,206.

*To all whom it may concern:*

Be it known that we, WILLIAM BIRKS, lace-manufacturer, and HENRY SMITH CROPPER, engineer, subjects of the Queen of Great Britain, both residing at Nottingham, England, have invented certain new and useful Improvements in Apparatus to be Applied to Stitching and Embroidering Machines for the Production of Braided and other Embroidery, (for part of which we have obtained a patent in Great Britain, No. 1,206, bearing date January 26, 1888,) of which the following is a specification.

Our invention relates to the application of certain mechanical appliances or apparatus to sewing and embroidering machines by means of which we are enabled to produce a greater amount of variety in embroidered articles than has hitherto been produced by machinery.

By our invention we are enabled to embroider with any kind of material—such as gold and silver thread, (coarse or fine,) chenille, thick cords, braids, threaded beads, &c.—and we are enabled readily to throw the above-mentioned appliances or apparatus into and out of action, as may be desired, and the same may be held either in or out of action for any desired time.

The above-named materials are not passed through the eye of the needle, but are stitched on the surface of the fabric by means of the needle, although the latter does not pass through them.

Our invention consists in the novel features of construction hereinafter described and claimed.

Our invention is represented in the accompanying drawings, in which—

Figure 1:
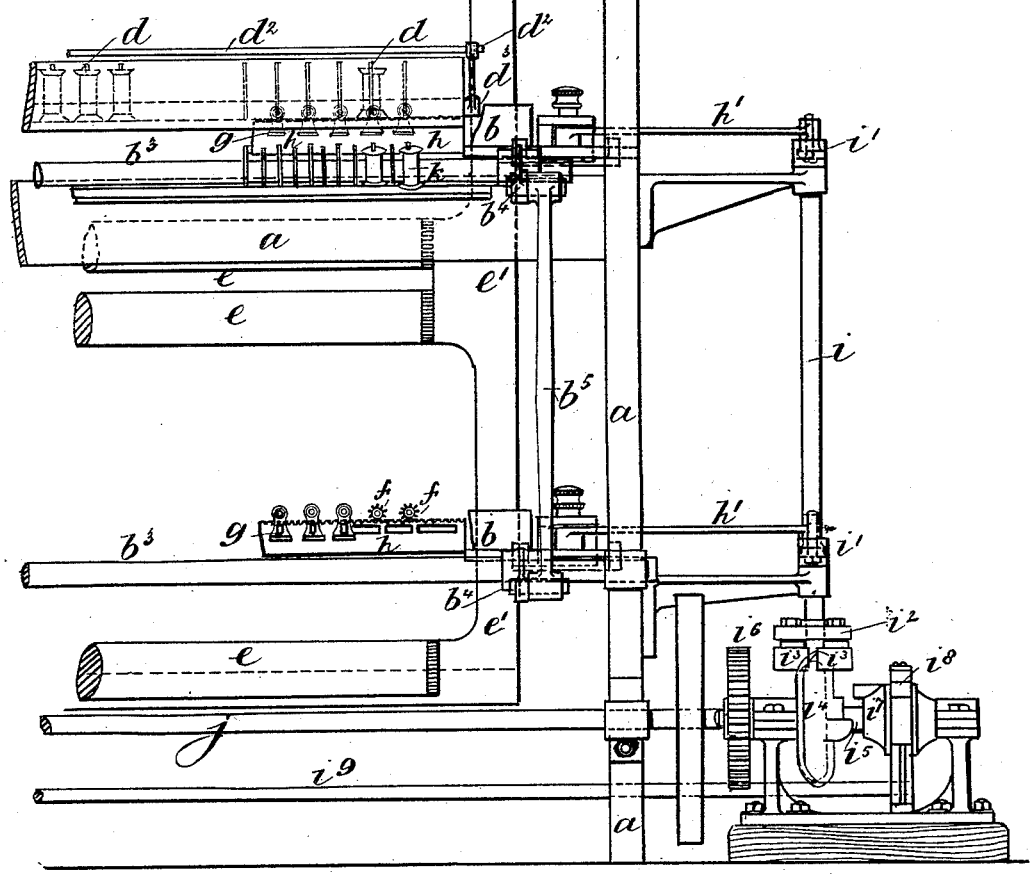
Figure 2:
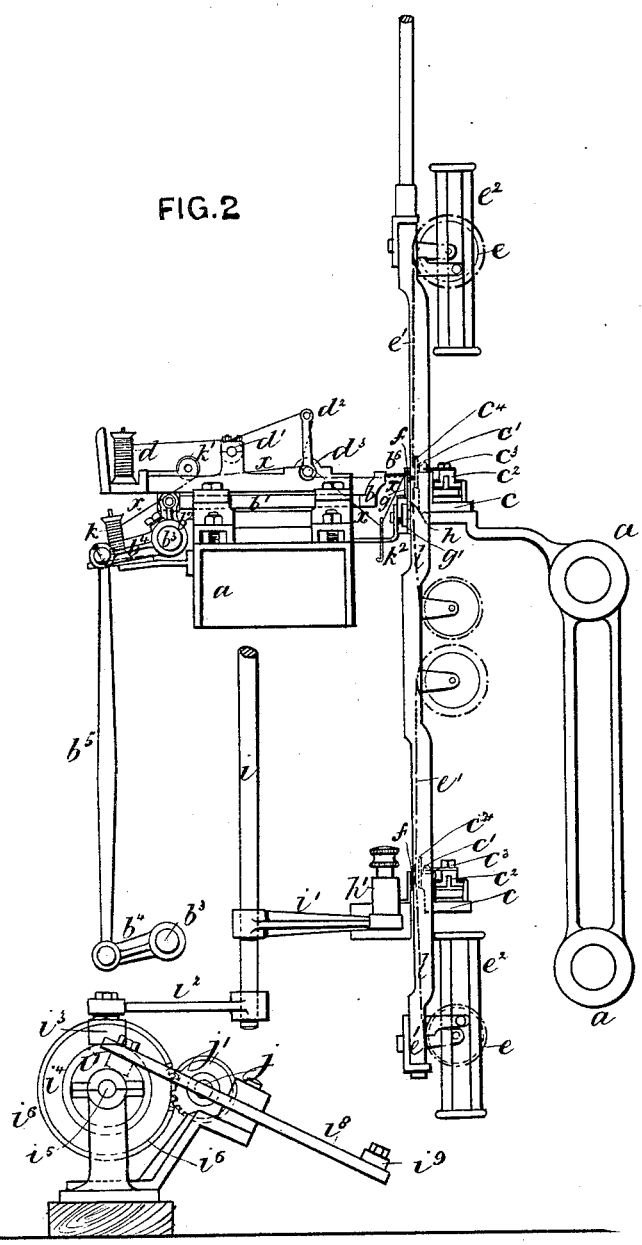
Figure 9:
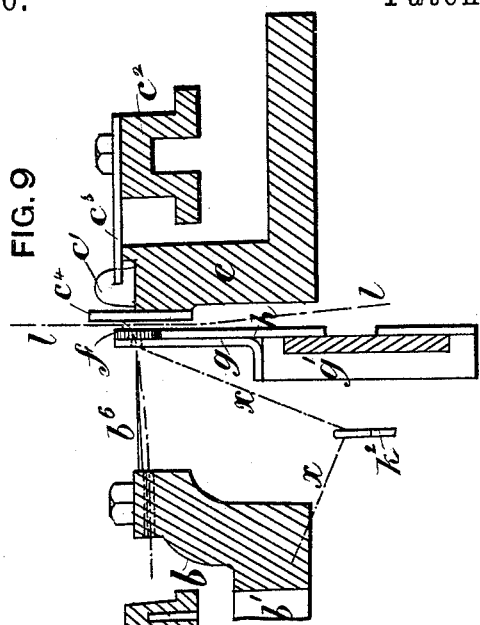
Figure 8:
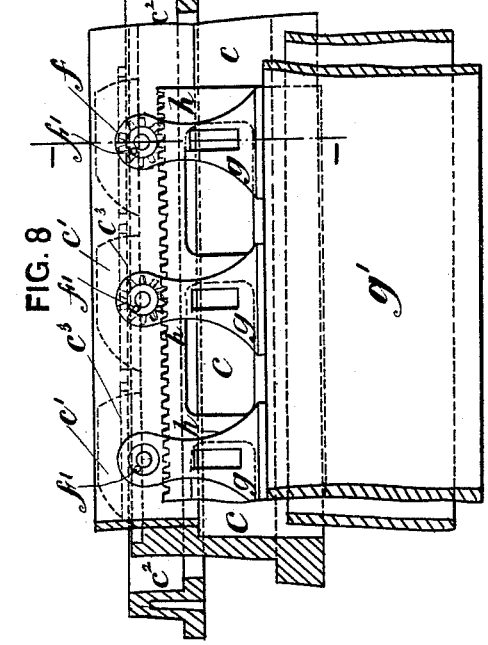
Figure 10:
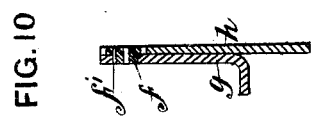

Figure 1 is a front view, and Fig. 2 is an end view, of so much of a shuttle embroidery-machine as will enable us to describe our invention as applied thereto. Figs. 3 and 4 are respectively a plan and a sectional end view of the rack-bar and parts connected therewith drawn to a larger scale. Fig. 5 is a plan, Fig. 6 is a front view, and Fig. 7 is an end view, of the treadle apparatus separately; and Fig. 8 is a front view, Fig. 9 is a cross-section, and Fig. 10 is a section on the line 1 1 of Fig. 8, showing the embroidery-instruments drawn to a still larger scale than Figs. 3 to 7. Fig. 11 is a plan of the cam shown in Fig. 1, and Fig. 12 is an enlarged view of parts shown at Fig. 2.

In all the figures like parts are indicated by similar letters of reference.

In Figs. 1 and 2 many of the well-known parts of the machine are omitted, in order that our invention may be clearly shown.

$a\ a$ represent parts of the frame of the machine.

$b$ are the longitudinal needle-bars carried by reciprocating transverse guide-bars $b'$, which are connected to levers $b^2$, fixed on longitudinal shafts $b^3$, and such shafts $b^3$ are connected together by means of levers $b^4$, fixed thereon, and by links or connecting-rods $b^5$, connecting such levers $b^4$ together. Motion is given to one or other of the shafts $b^3$ in the ordinary manner.

$b^6$ is a needle secured to the longitudinal needle-bar transversely of the latter and parallel with the guide-bars.

$c$ is the longitudinal bar on which the shuttle-race is formed.

$c'$ are shuttles.

$c^2$ is the bar for giving motion to the shuttles $c'$ through the medium of the drivers $c^3$.

$d\ d$ are the bobbins for supplying thread to the needles, which thread is conducted from the bobbins $d\ d$ around rollers $d'$, over the bar $d^2$, under the bar $d^3$, and thence through holes in the bar $b$ to the needles.

The fabric to be embroidered is carried by and strained between rollers $e\ e$, supported in a frame $e'$, which carries the fabric in a vertical position between the needles $b^6$ and the face $c^4$ of the shuttle-race bar $c$, and such frame $e'$ is guided vertically by vertical guides $e^2$, and is supported at the top in the manner well understood, and such frame is operated by means of a pantograph (not shown) to move the work in any required vertical or horizontal direction, according to the pattern to be produced, as is well understood. The parts above described are common to this desciption of embroidery-machine, and the moving parts are operated by cams and levers in any ordinary manner.

In achieving the object of our invention we locate a small pinion or toothed wheel $f$ in front of each needle $b^6$. These pinions or toothed wheels $f$ are each placed in a bearing formed in an intermediate bracket $g$, fixed to the longitudinal bar $g'$, and they are arranged with their flat surface toward the fabric, and so that each pinion or toothed wheel $f$ revolves around its own axis within the bearing formed in the bracket $g$. The centers or axes of the toothed wheels or pinions $f$ are placed opposite to the points of the needles $b^6$, so that the needles in their usual course of working can enter and pass through the pipes or hollow journals of the toothed wheels or pinions $f$. In each of these toothed wheels or pinions we form an eccentric guide-hole $f'$, through which we pass the cord, braid, or other material $x$, which is to be affixed to the fabric. These toothed wheels or pinions $f$ are each geared into a reciprocating longitudinal rack-bar $h$, from which they receive a simultaneous reciprocating motion in the following manner. Each rack-bar $h$ is by a link $h'$ connected to a lever $i'$, fixed on the vertical shaft $i$, on the lower end of which is fixed an arm or lever $i^2$, carrying two trucks or rollers $i^3$, which fit on each side of a cam $i^4$, by which such lever $i^2$ receives a reciprocating motion. The cam $i^4$ is mounted on a shaft $i^5$, which receives rotary motion from the shaft $j$ by means of the toothed gearing $j'\ i^6$. Thus at each stitch the pinions or toothed wheels $f$ are caused to receive a rotary motion alternately to the right and left. The cam $i^4$ is mounted loosely on its shaft $i^5$; but it is when desired caused to revolve with it by means of a clutch $i^7$, riding on a key on the shaft $i^5$, and which is operated by one end of a lever $i^8$, the other end of which is, by a rod or shaft $i^9$, connected at the other end of machine to a lever $i^{10}$, which is mounted on an axis at $i^{11}$, and is operated in one direction by a treadle $i^{12}$ and in the other by a spring $i^{13}$.

The cord or other material $x$ that is be used in producing the embroidery is contained on bobbins $k$ and passes from such bobbins around the rollers $k'$, over the bar $d^3$, through the eyes of the tension-wires $k^2$, and thence through the guide-holes in the toothed wheels or pinions $f$ to the fabric $l$, upon which it is stitched. The needles $b^6$, which are supplied with the ordinary thread, make a stitch. The toothed wheels or pinions $f$ are caused to revolve by the toothed rack-bar $h$ to the right or to the left, as the case may be, thus passing the cord or other material around the needle-thread. Another stitch is now made and the toothed wheels or pinions $f$ are caused to revolve again, but in the opposite direction, thus passing the cord or other material around the needle-thread in the opposite direction, and so on alternately at each stitch. It will be seen from the aforesaid description that the cord or other material is attached to the fabric by the needle-thread passing over it first on one side and then on the other side, thus firmly attaching the cord or other material to the fabric without the needle having to pass through it. At any time, if required by the design, the toothed wheels or pinions $f$ may be thrown out of action by the attendant operating the pantograph, who by the action of the foot throws the clutch $i^7$ into or out of gear with the cam $i^4$, thus connecting said cam with its shaft or disconnecting it therefrom at pleasure, while the needles continue to do embroidery of the ordinary description.

If it should be desired to keep the toothed wheels or pinions $f$ out of action for a considerable time, the lever $i^{10}$ is locked in the required position by means of a lever-catch $i^{14}$, thereby relieving the attendant from the necessity for keeping the foot on the treadle $i^{12}$ at such time.

By means of our improvements we obtain great facilities in producing various effects of embroidery, and also in the production of a purl or picot in manufacturing imitations of hand-made point lace.

Having fully described our invention, what we desire to claim and secure by Letters Patent is—

1. The combination of a longitudinal shuttle-race bar, a longitudinal needle-bar having needle-thread holes and needles, the reciprocating transverse guide-bars on which the needle-bar is carried, a fixed intermediate bracket having journal-bearings, the rotating pinions, each pinion being formed with a hollow journal for a needle to pass through and with an eccentric guide-hole for the embroidering material, and a reciprocating longitudinal rack-bar by which the pinions are rotated to place the embroidering material first on one side of the needle-thread and then on the other side thereof, substantially as described.

2. The combination of a needle-bar having a series of needles, reciprocating pinions, each pinion having an eccentric guide-hole for the embroidering material and a central hole for the passage therethrough of a needle, a rack-bar for operating said pinions, and an intermediate bracket having bearings for the pinions and fixed in front of the needle-bar, substantially as described.

3. The combination of a needle-bar having a series of needles, reciprocating pinions, each pinion having an eccentric guide-hole for the embroidering material and a central hole for the passage therethrough of a needle, a rack-bar for operating said pinions, a vertical shaft, a lever fixed on said shaft, a connecting-link from said rack-bar to said lever, an operating-lever on said shaft, a driving-shaft, an operating-cam mounted loosely on said driving-shaft, a clutch for connecting and disconnecting said cam with its shaft, and connecting-levers, shaft, and treadle for operating said clutch, substantially as described.

WILLIAM BIRKS.
HENRY SMITH CROPPER.

Witnesses:
 GEORGE SHAW,
 SYDNEY H. CROPPER.